US009435652B2

(12) United States Patent
Ralston et al.

(10) Patent No.: US 9,435,652 B2
(45) Date of Patent: Sep. 6, 2016

(54) DYNAMIC ROUTING INTELLIGENT VEHICLE ENHANCEMENT SYSTEM

(71) Applicant: Feeney Wireless, LLC, Eugene, OR (US)

(72) Inventors: Robert E. Ralston, Eugene, OR (US); Justin D. Bloom, Eugene, OR (US)

(73) Assignee: Novatel Wireless, Inc., San Diego, CA (US)

(*) Notice: Subject to any disclaimer, the term of this patent is extended or adjusted under 35 U.S.C. 154(b) by 134 days.

(21) Appl. No.: 14/134,738

(22) Filed: Dec. 19, 2013

(65) Prior Publication Data

US 2015/0179062 A1  Jun. 25, 2015

(51) Int. Cl.
| G08G 1/00 | (2006.01) |
| G01C 21/26 | (2006.01) |
| G08G 1/01 | (2006.01) |
| G08G 1/0967 | (2006.01) |
| G08G 1/0968 | (2006.01) |
| G01C 21/34 | (2006.01) |

(52) U.S. Cl.
CPC ............. *G01C 21/26* (2013.01); *G08G 1/0108* (2013.01); *G08G 1/0116* (2013.01); *G08G 1/0133* (2013.01); *G08G 1/0141* (2013.01); *G08G 1/0145* (2013.01); *G08G 1/096741* (2013.01); *G08G 1/096775* (2013.01); *G08G 1/096783* (2013.01); *G08G 1/096811* (2013.01); *G08G 1/096844* (2013.01); *G01C 21/3492* (2013.01)

(58) Field of Classification Search
CPC ...................... G01C 21/3697; G09G 1/096783
See application file for complete search history.

(56) References Cited

U.S. PATENT DOCUMENTS

| 6,466,139 B1 * | 10/2002 | Schmidt ........... G08G 1/096716 340/539.1 |
| 6,756,915 B2 * | 6/2004 | Choi .................... G08G 1/0962 235/384 |
| 7,010,583 B1 * | 3/2006 | Aizono ............ G08G 1/096716 340/989 |
| 8,019,533 B2 * | 9/2011 | Mudalige ............... G01C 21/26 370/328 |
| 8,165,748 B2 * | 4/2012 | Goto ................... G01C 21/3626 340/905 |
| 8,289,188 B2 * | 10/2012 | Ueno ............... G08G 1/096716 340/905 |

(Continued)

*Primary Examiner* — Thomas G Black
*Assistant Examiner* — Peter D Nolan
(74) *Attorney, Agent, or Firm* — TechLaw LLP

(57) ABSTRACT

Embodiments of the invention provide a dynamic routing intelligent vehicle enhancement system and method. Intelligent land buoys can be proximately disposed to roadways. Each of the intelligent land buoys can gather situational awareness information about the roadways and one or more vehicles traveling thereon. The intelligent land buoys can compress the situational awareness information. One or more remote computer servers can receive the compressed situational awareness information from the plurality of intelligent land buoys, decompress it, and process the decompressed situational awareness information. The one or more remote computer servers can generate vehicle operational intelligence information based at least on the decompressed situational awareness information, and can transmit the vehicle operational intelligence information to the plurality of intelligent land buoys and/or directly to one or more autonomous or semi-autonomous vehicles.

32 Claims, 12 Drawing Sheets

(56) References Cited

U.S. PATENT DOCUMENTS

| | | | |
|---|---|---|---|
| 8,299,940 B2* | 10/2012 | Kinoshita | G01C 21/26 340/905 |
| 8,907,813 B2* | 12/2014 | Cajigas Bringas | G08G 1/052 340/539.1 |
| 2005/0221759 A1* | 10/2005 | Spadafora | G08G 1/09 455/41.2 |
| 2007/0096953 A1* | 5/2007 | Odagiri | H03M 7/3084 341/50 |
| 2007/0109146 A1* | 5/2007 | Tengler | G08G 1/0965 340/902 |
| 2007/0217372 A1* | 9/2007 | Gorday | H04L 45/00 370/338 |
| 2008/0091339 A1* | 4/2008 | Nagase | G01C 21/32 701/532 |
| 2008/0136670 A1* | 6/2008 | Tengler | G08G 1/20 340/905 |
| 2010/0019933 A1* | 1/2010 | Aono | G08G 1/017 340/905 |
| 2010/0136909 A1* | 6/2010 | Nagatomo | G01C 21/26 455/41.2 |
| 2010/0321206 A1* | 12/2010 | Kuga | G01C 21/3679 340/905 |
| 2011/0035098 A1* | 2/2011 | Goto | G01C 21/3626 701/36 |
| 2011/0102194 A1* | 5/2011 | Kinoshita | G01C 21/26 340/905 |
| 2011/0128139 A1* | 6/2011 | Tauchi | B60K 35/00 340/439 |
| 2011/0136548 A1* | 6/2011 | Sakai | G01C 21/3697 455/569.2 |
| 2011/0148659 A1* | 6/2011 | Ueno | G08G 1/096716 340/905 |
| 2012/0158276 A1* | 6/2012 | Kim | G08G 1/0962 701/119 |
| 2012/0270558 A1* | 10/2012 | Busch | H04W 76/002 455/456.1 |
| 2014/0051346 A1* | 2/2014 | Li | H04H 20/59 455/3.01 |
| 2014/0207362 A1* | 7/2014 | Shimotani | G08G 1/13 701/119 |
| 2014/0249718 A1* | 9/2014 | Liu | G08G 1/16 701/41 |
| 2015/0153196 A1* | 6/2015 | Tayar | G01C 21/3697 340/905 |
| 2015/0170429 A1* | 6/2015 | Denny | G07C 5/008 701/36 |

* cited by examiner

| ROUTE SEGMENT | IMPEDANCE SCORES 1068 |
|---|---|
| 1005 | SCORE 0.6 (where A=0.6) |
| 1010 | SCORE -0.3 (where B=-0.3) |
| 1015 | SCORE 0.8 (where B=0.8) |

| COMPLETE ROUTE | AGGREGATED PORTIONS OF ROUTE SEGMENT SCORES 1045 | NORMALIZED PORTIONS OF ROUTE SEGMENT SCORES 1047 | IMPEDANCE SCORE HISTORY 1065 |
|---|---|---|---|
| 1st COMPLETE ROUTE → 1005 + 1010 | 0.3 — 1060 | 0.15 — 1062 | 0.10 — 1070 |
| 2nd COMPLETE ROUTE → 1005 + 1010 + 1015 | 1.1 | 0.367 | 0.2 — 1075 |
| ⋮ | | | |
| Nth COMPLETE ROUTE → | | | |

FIG. 10C

DYNAMIC ROUTING INTELLIGENT VEHICLE ENHANCEMENT SYSTEM

FIELD OF THE INVENTION

This application pertains to autonomous and/or semi-autonomous vehicles, and more particularly, to a dynamic routing intelligent vehicle enhancement system and related methods for acquiring situational awareness information, and providing operational intelligence to autonomous and/or semi-autonomous vehicles for safe, efficient, and automated land navigation.

BACKGROUND

Conventionally, vehicles have been operated by humans. More recent advances have focused on making vehicles operationally autonomous or at least semi-autonomous. The expectation is that safety can be increased by removing the element of human error, which is the primary cause of accidents. But current approaches are limited by the small and localized type of information available to the vehicle, such as line of sight, immediate road obstructions, misinterpretation of localized data (e.g., mistaking a pedestrian for a stationary object), or the like. Since autonomous vehicles must often make decisions having life-or-death implications to humans, such a limited amount of low-quality information presents a challenge, and is insufficient for a standard of safety that is acceptable to society and governments at large.

Indeed, for advanced autonomous vehicle technology to take root in the world, significant enhancements to safety must be achieved. While automated systems can provide reliable operation for some or most of the time, human intervention might be needed in the event of system failure, particularly adverse weather conditions, unexpected events, or other situations not anticipated by the conventional technology. For example, a human might be required to take control of the vehicle under peculiar situations within a certain period of time, such as 10 seconds, 20 seconds, or the like. Such requirements may be mandated by governments to ensure a certain level of system quality and safety. However, existing technology lacks the granular type of information needed to provide an alert under such conditions, and thus, it fails to achieve appropriate levels of safety.

In addition, conventional navigation technologies fail to provide sufficient granular navigable information for autonomous vehicles to truly operate with high levels of safety and performance. The situation on the road is often dynamic and frequently changes. Traffic jams can occur at various times of the day. Accidents can introduce an element of temporary chaos. Road obstructions can be dangerous. Roadways are inefficiently used. Some routes are taken by drivers when other routes would be better. Congestion, frustration, road rage, fuel inefficiencies, and the like, are the undesirable result.

Accordingly, a need remains for a dynamic routing intelligent vehicle enhancement system and related methods. A need also remains for a smart grid to improve the utility and capacity of existing roads. Embodiments of the invention address these and other limitations in the prior art.

BRIEF DESCRIPTION OF THE DRAWINGS

FIG. 10B illustrates a table including example associations between route segments and impedance scores in accordance with embodiments of the present invention.

FIG. 10C illustrates a table including example associations between complete routes and aggregated portions of route segment impedance scores in accordance with embodiments of the present invention.

The foregoing and other features of the invention will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first network could be termed a second network, and, similarly, a second network could be termed a first network, without departing from the scope of the inventive concept.

It will be understood that when an element or layer is referred to as being "on," "coupled to" or "connected to" another element or layer, it can be directly on, directly coupled to or directly connected to the other element or layer, or intervening elements or layers may be present. In contrast, when an element is referred to as being "directly on," "directly coupled to" or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
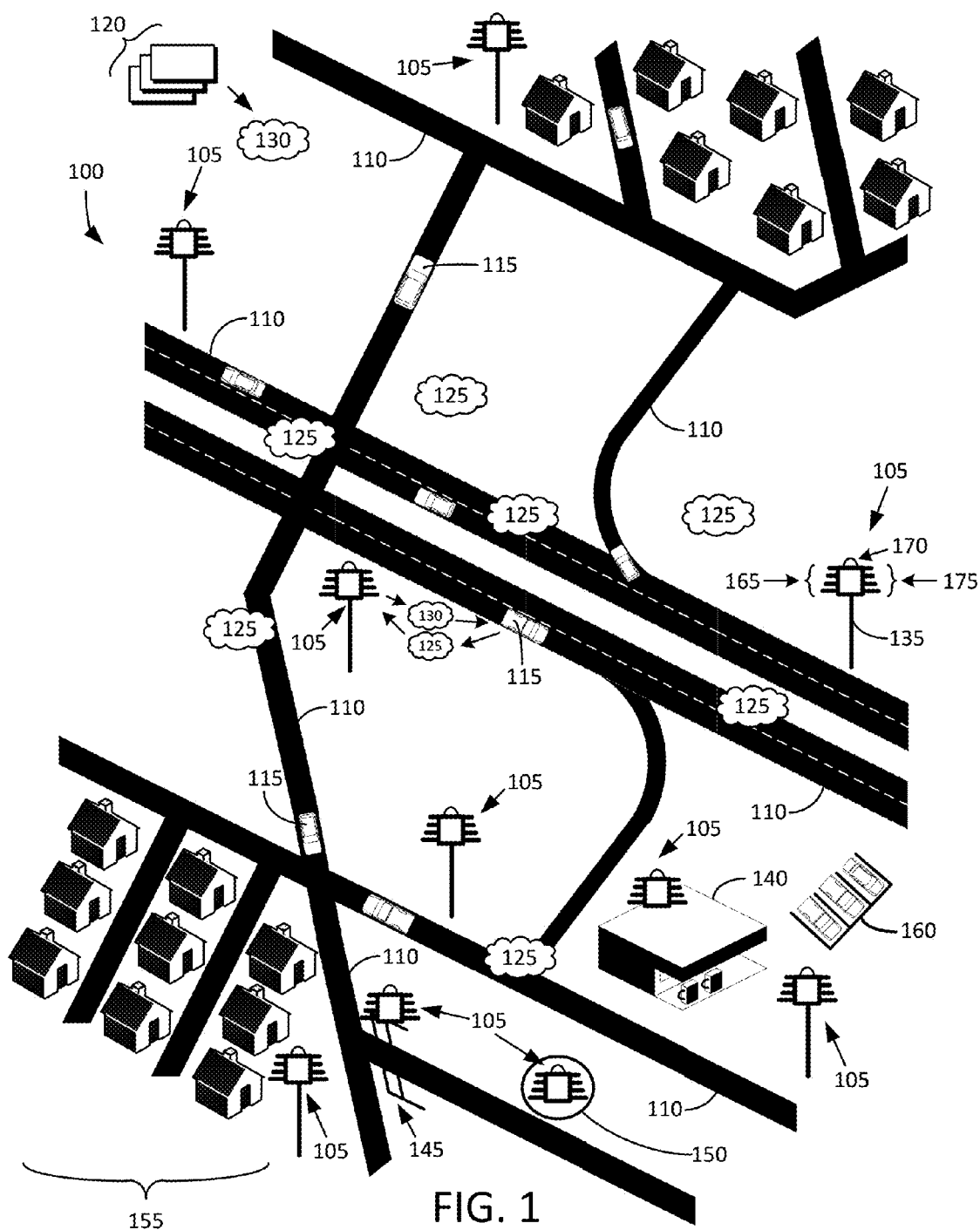
FIG. 1 illustrates a diagram of an example system for acquiring situational awareness information and for providing operational intelligence to autonomous and/or semi-autonomous vehicles in accordance with various embodiments of the present invention.

FIG. 1 illustrates a diagram 100 of an example system for acquiring situational awareness information and for providing operational intelligence to autonomous and/or semi-autonomous vehicles in accordance with various embodiments of the present invention.

Intelligent land buoys (e.g., 105) can be proximately disposed to a plurality of roadways (e.g., 110). The term "roadways" can include roads, intersections, bridges, railways, rail crossings, or the like. Each of the intelligent land buoys 105 can gather situational awareness information (e.g., 125) about one or more route segments of the roadways 110, and about one or more vehicles (e.g., 115) traveling thereon. In some embodiments, the intelligent land buoys 105 can receive situational awareness information 125 directly from the one or more vehicles 115. The situational awareness information 125 can include information about the present state of reality as it relates to associated vehicle route segments, adjacent areas, and/or vehicles. Examples of the situational awareness information 125 are further described in detail below.

The intelligent land buoys 105 can compress and/or store the situational awareness information 125, the compression technique of which is also further described in detail below. One or more remote computer servers (e.g., 120) can be communicatively coupled to the intelligent land buoys 105 and can receive the compressed situational awareness information 125 from the plurality of intelligent land buoys 105. The one or more remote computer servers 120 can be distributed and/or clustered. The one or more remote computer servers 120 can decompress the situational awareness information 125, process the decompressed situational awareness information 125, and/or store the decompressed situational awareness information 125. Consequently, the one or more remote computer servers 120 can generate vehicle operational intelligence information 130 based at least on the decompressed situational awareness information 125, as also further described in detail below.

The one or more remote computer servers 120 can transmit the vehicle operational intelligence information 130 to the plurality of intelligent land buoys 105. One or more of the intelligent land buoys 105 may in turn transmit the operational intelligence information 130 to the one or more vehicles 115. In addition or alternatively, the one or more remote computer servers 120 can directly transmit the vehicle operational intelligence information 130 to the one or more vehicles 115. In other words, a map service and/or navigation device associated with the vehicle or provided within the vehicle can receive the operational intelligence information 130 so that it can have access to real-time and highly accurate operational information.

The intelligent land buoys 105 can be configured to transmit a beacon including the vehicle operational intelligence information 130 to the one or more vehicles 115. The beacon may be periodically transmitted. In addition or alternatively, the beacon may be continually transmitted. The plurality of intelligent land buoys 105 can be located at an elevation that is higher than tops of the one or more vehicles 115, and can transmit the beacon including the vehicle operational intelligence information 130 toward the one or more vehicles 115. For example, each of the intelligent land buoys 105 can be attached to a utility pole 135, a traffic signal pole or apparatus 145, a building 140, a hovering airborne drone 150, a radio tower (not shown), or the like.

The one or more vehicles 115 can include an autonomous vehicle and/or a semi-autonomous vehicle. The vehicle can be an automobile for primarily transporting people. In addition, the vehicle can be other suitable types of vehicles for transporting goods, people, or any combination thereof. For example, the vehicle can be a car, a truck, a train, or the like. An autonomous vehicle incorporates artificial intelligence. For example, an autonomous vehicle can automatically navigate and operate the vehicle itself with little to no assistance from a human operator. A semi-autonomous vehicle also incorporates artificial intelligence, but not to the same degree as the autonomous vehicle. In other words, a semi-autonomous vehicle may require some assistance or operational control from a human. For the purposes of this disclosure, when referring to a "vehicle" or "vehicles," such vehicle or vehicles can be autonomous, semi-autonomous, or any combination thereof.

The vehicle operational intelligence 130 can include dynamic vehicle routing information. For example, the vehicle operational intelligence 130 can assist a vehicle to navigate from a first geographic location to a second geographic location. The geographic locations can be within a neighborhood 155, in a parking lot 160, near a building 140, on a road such as highway 110, or the like. In addition, the vehicle operational intelligence 130 can include a predictive awareness alert indicating a time period within which an occupant in a particular vehicle from among the one or more vehicles is advised to take operational control of the particular vehicle, as further described in detail below.

Each of the intelligent land buoys 105 can include one or more short range radio transceivers (e.g., 165) to receive, from the one or more vehicles 115, at least a first portion of the situational awareness information 125 about the roadways 110 and the one or more vehicles 115 traveling thereon. In addition, each of the intelligent land buoys 105 can include one or more visible light cameras (e.g., 170) to receive at least a second portion of the situational awareness information 125 about the roadways 110 and the one or more vehicles 115 traveling thereon. Moreover, each of the intelligent land buoys 105 can include one or more long range radio transceivers (e.g., 175) to transmit, to the one or more remote computer servers 120, the compressed situational awareness information 125. Additional details of additional and various components of the intelligent land buoys 105 are provided below.

Figure 2:
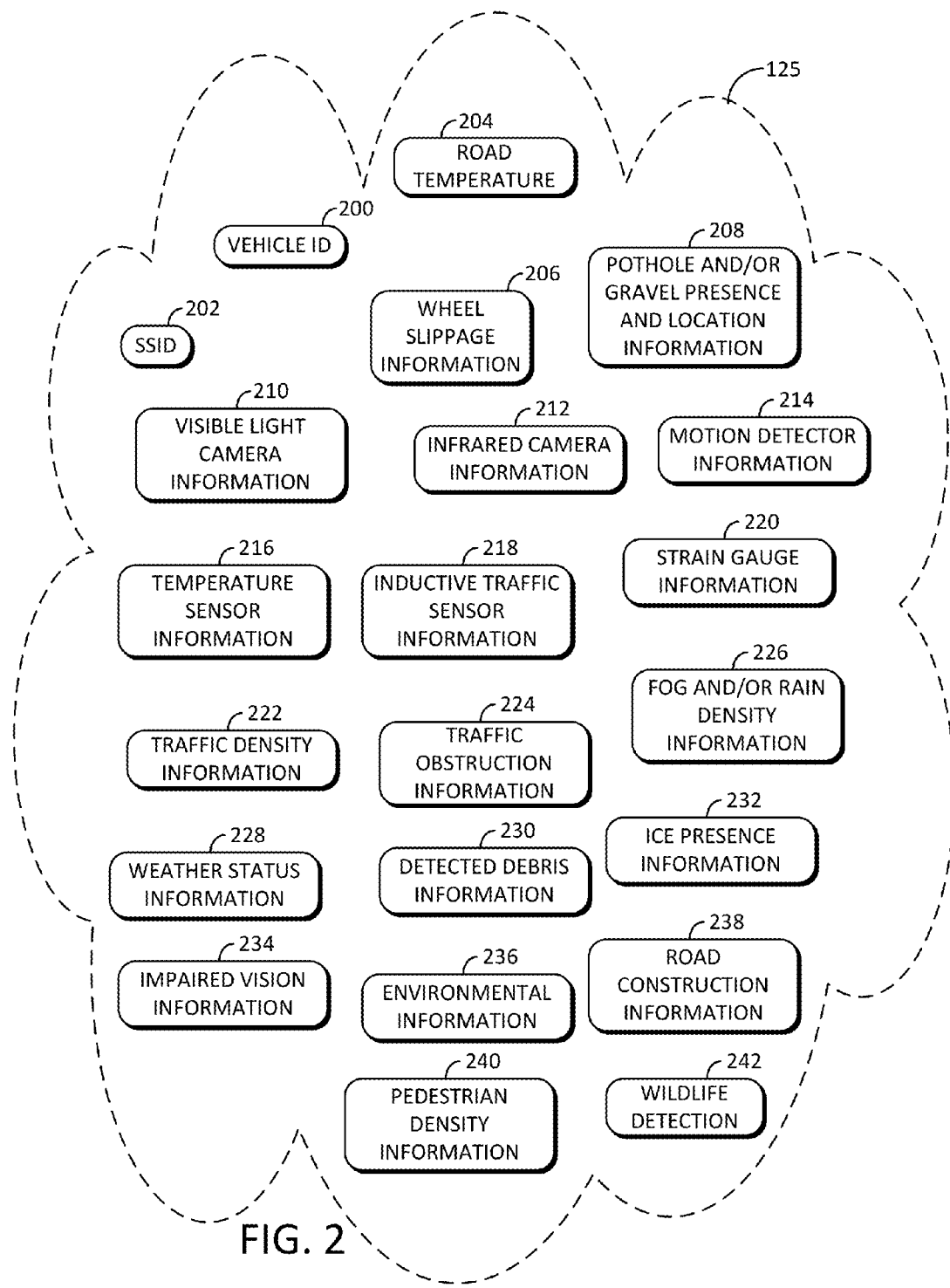
FIG. 2 illustrates a diagram of examples of situational awareness information according to various embodiments.

FIG. 2 illustrates a diagram of the examples of the situational awareness information 125 (of FIG. 1) gathered by the intelligent land buoys 105 (of FIG. 1) according to various embodiments. The situational awareness information 125 can include, for example, a vehicle identification (ID) 200, a service set identification (SSID) 202 associated with a mobile phone or other mobile device, road temperature 204, wheel slippage information 206, pothole and/or gravel presence and location information 208, visible light camera information 210, infrared camera information 212, motion detector information 214, temperature sensor information 216, inductive traffic sensor information 218, strain gauge information 220, traffic density information 222, traffic obstruction information 224, fog and/or rain density information 226, weather status information 228, detected debris information 230, ice presence information 232, impaired vision information 234, environmental information 236, road or tunnel construction or maintenance information 238, pedestrian density information 240, wild life detection information 242, or the like.

The intelligent land buoys 105 (of FIG. 1) can gather and process the situational awareness information 125 and react to it in real-time. For example, one or more of the intelligent land buoys 105 can detect a first location of a particular vehicle from among the one or more vehicles 115, and to detect a second location of the particular vehicle from among the one or more vehicles 115. In this manner, the location, distance traveled, speed, and so forth, of the one or more vehicles 115 can be determined. Such determination can be made by the intelligent land buoys 105 by tracking SSIDs that are broadcast from the vehicles, MAC addresses, or other suitable vehicle identifiers. Moreover, the intelligent land buoys 105 can use machine vision techniques to make such determinations. The SSID or other identifiers need not reveal any personal or private information about the vehicle or its occupants.

By way of a more specific example, one or more of the intelligent land buoys 105 can detect a first location of a particular vehicle associated with a particular SSID from among the one or more vehicles 115, and to detect a second location of the particular vehicle associated with the particular SSID from among the one or more vehicles 115, and thus, the location, distance traveled, speed, etc., can be determined.

In addition or alternatively, the intelligent land buoys 105 can transmit the first location information and the second location information to the one or more remote computer servers 120 (of FIG. 1), and the one or more remote computer servers 120 can determine the location, distance traveled, speed, and so forth, of the particular vehicle based at least on the first location information and the second location information.

The intelligent land buoys 105 can compress, store, and/or transmit the gathered situational awareness information 125 to the one or more remote servers 120 (of FIG. 1). The types of compression are described in detail below. The one or more remote servers 120 can receive, de-compress, and process the situation awareness information 125, and provide the operational intelligence information 130 in real-time or near real-time to the intelligent land buoys 105.

Figure 3:
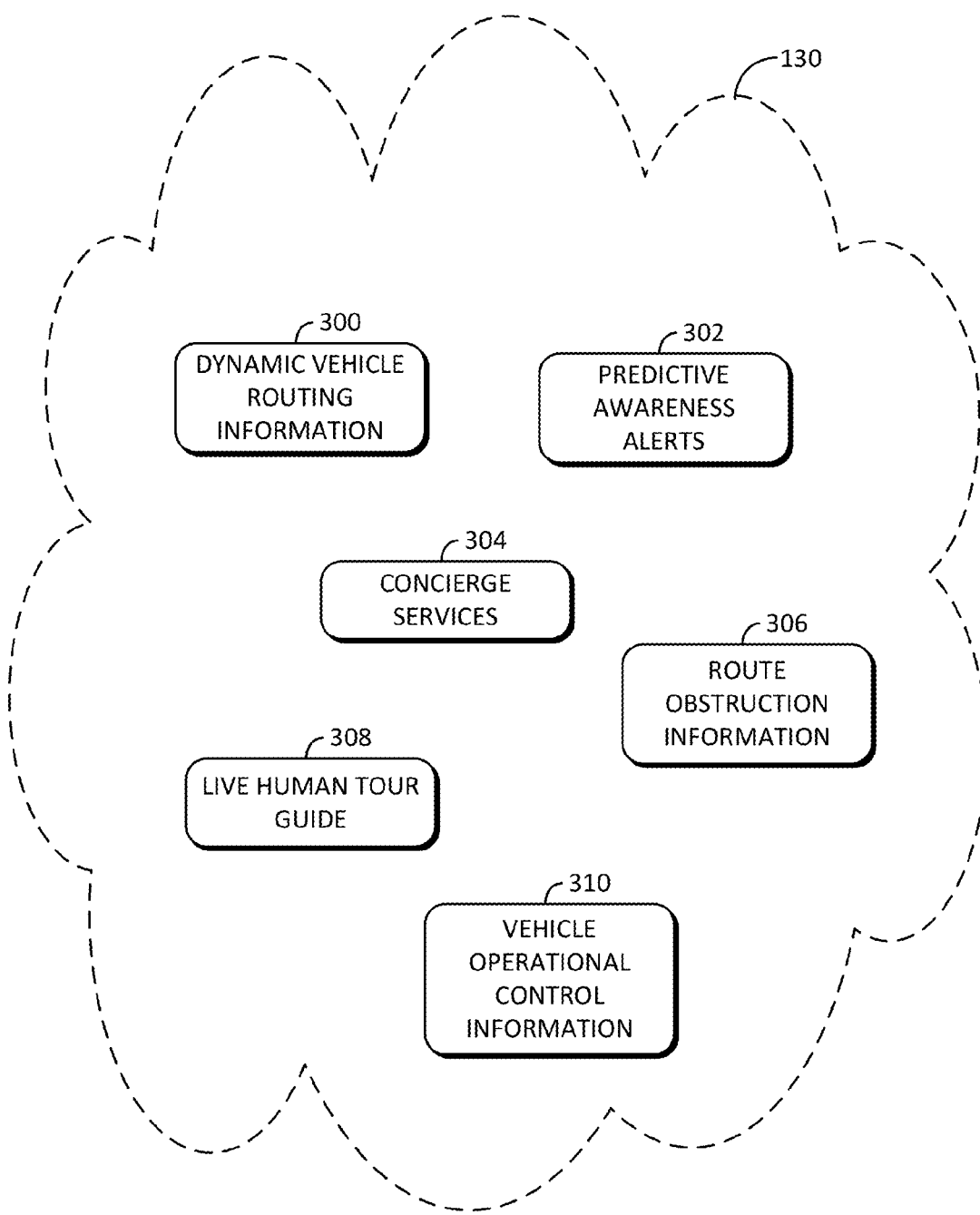
FIG. 3 illustrates a diagram of examples of vehicle operational intelligence information according to various embodiments.

FIG. 3 illustrates a diagram of examples of the vehicle operational intelligence information 130 (of FIG. 1) according to various embodiments. The vehicle operational intelligence information 130 can include, for example, dynamic vehicle routing information 300, predictive awareness alerts 302, concierge services 304, route obstruction information 306, a live human tour guide 308, vehicle operational control information 310, and the like.

For example, a vehicle operator or passenger may speak or interact with the live human tour guide 308. The human tour guide 308 can have access to specific information about preferred routes, points of interest, local culture, and the like. The human tour guide 308 can assist in selecting a best route and may also provide route impedance information for routes that are not preferred or are currently under heavy traffic, under construction, or the like.

As mentioned above, the vehicle operation intelligence information 130 can be generated based on the gathered situational awareness information 125. The one or more vehicles 115 and/or occupants thereof can use the vehicle operational intelligence information 130. For example, the one or more vehicles 115 can automatically, efficiently, and safely navigate from one location to another using the vehicle operational intelligence information 130.

Figure 4:
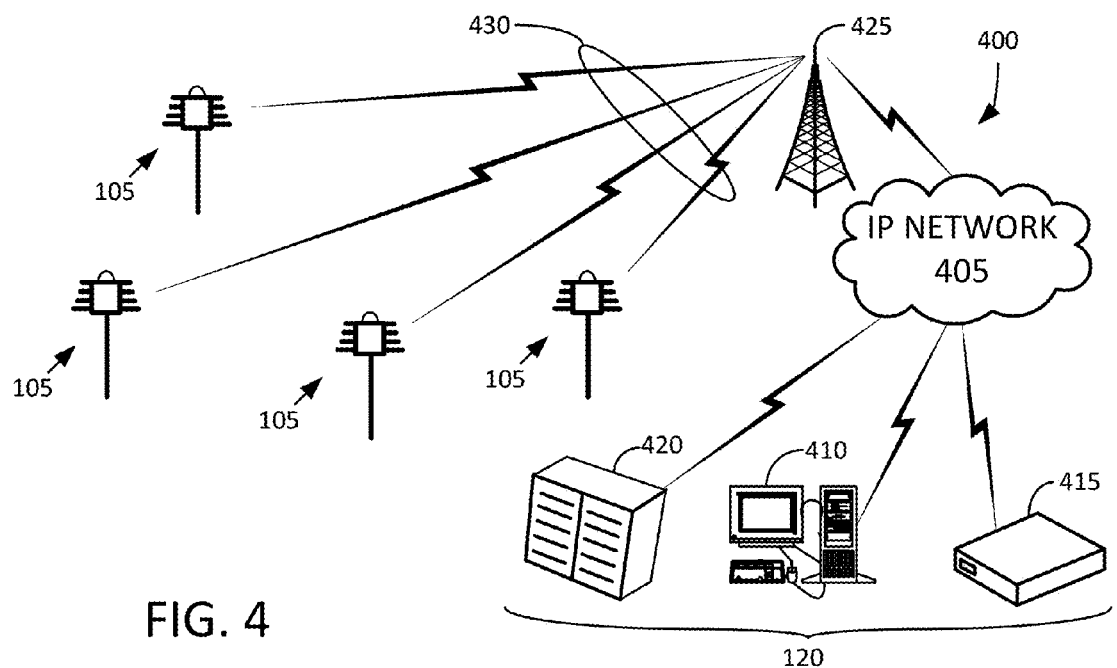
FIG. 4 illustrates a diagram of distributed intelligent land buoys connected to one or more remote servers in accordance with embodiments of the present invention.

FIG. 4 illustrates a diagram 400 of distributed intelligent land buoys 105 connected to one or more remote servers 120 in accordance with embodiments of the present invention. The one or more remote servers 120 can include, for example, a workstation 410, a computer server 415, a database or storage farm 420, or the like. The one or more remote servers 120 may be communicatively coupled to one or more cellular towers 425 via an IP network 405. The IP network 405 may be public or private. The one or more cellular towers 425 may be communicatively coupled to the distributed intelligent land buoys 105 via one or more cellular networks 430. In addition or alternatively, the one or more cellular towers 425 may be communicatively coupled to the distributed intelligent land buoys 105 via one or more IP networks including satellite networks, microwave radio networks, wired networks, fiber optic networks, and the like.

Figure 5:
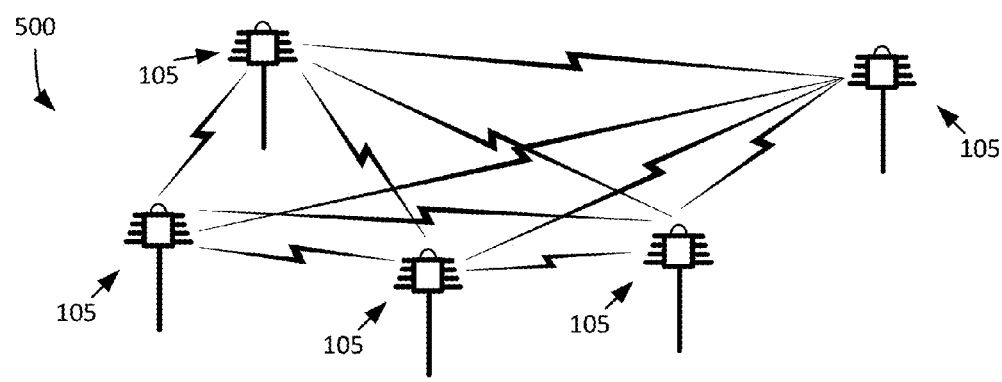
FIG. 5 illustrates a diagram of interconnected intelligent land buoys in accordance with embodiments of the present invention.

FIG. 5 illustrates a diagram 500 of interconnected intelligent land buoys 105 in accordance with embodiments of the present invention. The interconnected intelligent land buoys 105 may be configured as a mesh or ad-hoc network. In this embodiment, the operations and processing that would otherwise be performed by the one or more remote servers 120 are instead performed by each of the intelligent land buoys 105 of the network. In other words, in this embodiment, there is no need for the remote servers 120. Moreover, the data that is developed and processed by each of the intelligent land buoys 105 can be automatically shared among the other intelligent land buoys 105. In such manner, the situational awareness information 125 can be obtained and processed by the network itself. In addition, the network of interconnected intelligent land buoys 105 can generate the operational intelligence information 130 based on the gathered situational awareness information 125.

Figure 6:
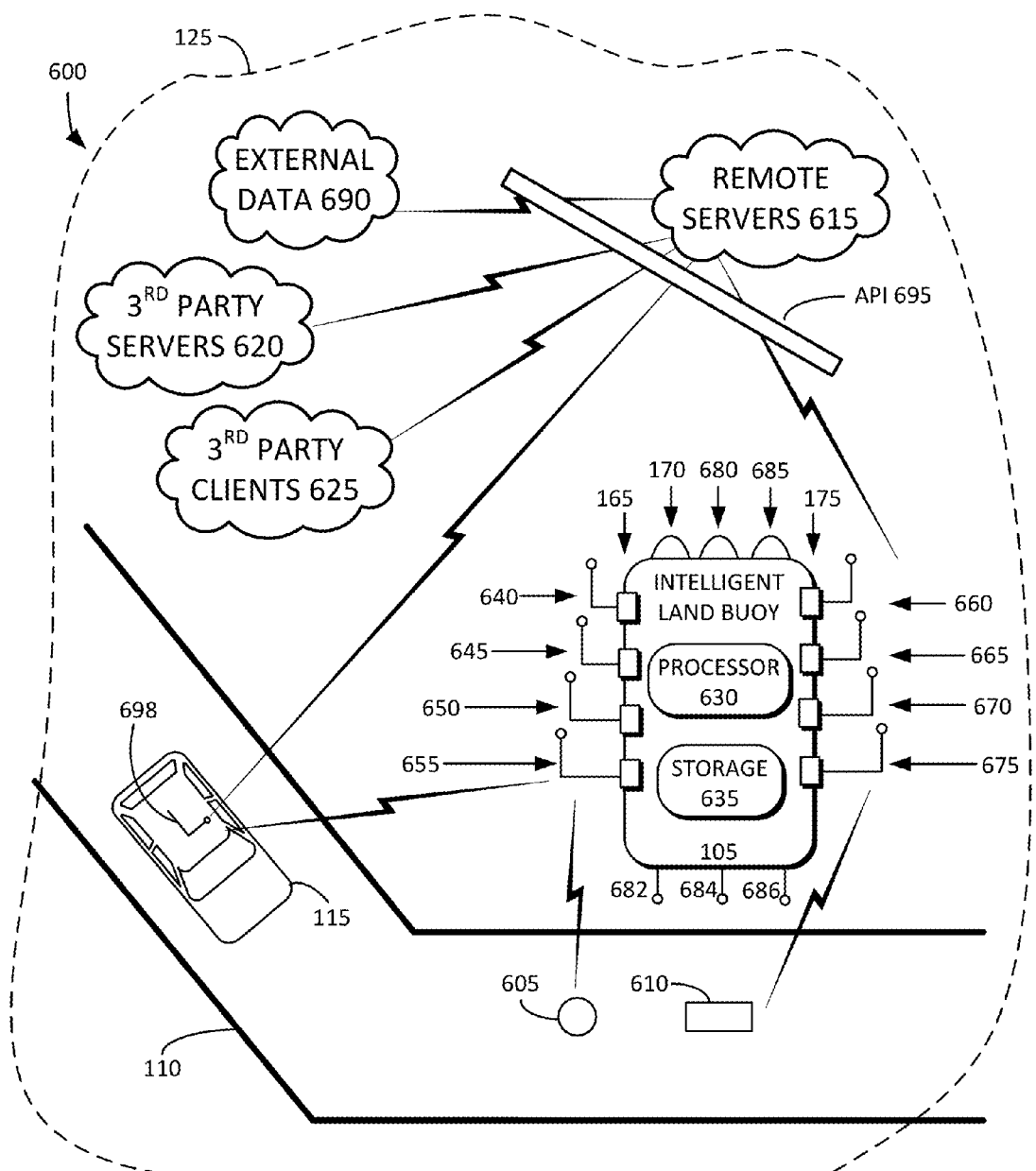
FIG. 6 illustrates a diagram of an example system including an intelligent land buoy interconnected with a vehicle, sensors, remote servers, third party servers, and third party clients, in accordance with embodiments of the present invention.

FIG. 6 illustrates a diagram of an example system 600 including an intelligent land buoy 105 interconnected with a vehicle 115, sensors 605 and 610, remote servers 615, third party servers 620, and third party clients 625, in accordance with embodiments of the present invention.

The intelligent land buoy 105 can include a processor 630 to compress the situational awareness information 125, and storage 635 to store the situational awareness information 125 in either compressed or uncompressed form. The intelligent land buoy 105 can further include one or more short range radio transceivers 165, each of which may have associated therewith an antenna. For example, the short range radio transceivers can include a WIFI compatible transceiver 640, a ZIGBEE compatible transceiver 645, a BLUETOOTH compatible transceiver 650, and/or a HART compatible transceiver 655. The intelligent land buoy 105 can further include one or more long range radio transceivers 175, each of which may have associated therewith an antenna. For example, the long range radio transceivers can include a cellular compatible transceiver 660, a satellite compatible transceiver 665, a global positioning system (GPS) compatible transceiver 670, or other suitable transceiver 675. The short and/or long range transceivers can be associated with a local area network (LAN) and/or a wide area network (WAN). The cellular transceiver can be associated with Long Term Evolution (LTE), Enhanced Voice-Data Optimized (EVDO), High Speed Packet Access (HSPA), or other suitable cellular technologies.

The intelligent land buoy 105 can include or otherwise be communicatively connected with a visible light camera 170 to gather the visible light camera information 210 (of FIG. 2), an infrared camera 680 to gather the infrared camera information 212 (of FIG. 2), and/or a motion detector device 685 to gather the motion detector information 214 (of FIG. 2). The intelligent land buoy 105 can further include a radar device 682 and/or a LIDAR device 684. The intelligent land buoy 105 can further include a radio frequency ID (RFID) tag 686, which can be passive or active. The tag can be energized, for example, responsive to vehicles passing over an inductive loop in the road.

The intelligent land buoy 105 can be communicatively coupled to sensors 605 and/or 610. The sensors 605 and/or 610 may be embedded in the road 110 or otherwise located adjacent to or nearby the road 110. The intelligent land buoy 105 can receive situational awareness information 125 from the sensor(s) via a wireless or wired connection. The sensor 605 can be a temperature sensor and the sensor 610 can be an inductive traffic sensor. The inductive traffic sensor 610 can detect when a vehicle passes over and can transmit a signal to the intelligent land buoy 105 representing such an occurrence. The inductive traffic sensor 610 can also transmit, to the intelligent land buoy 105, a count of the number of times a vehicle passes over for a particular period of time.

The one or more remote servers 615 can receive and/or transmit information via an application specific interface (API) 695. The one or more remote servers 615 can periodically receive new situational awareness information 125 from each of the intelligent land buoys 105 via the API 695. The one or more remote computer servers 615 can receive external data 690 from one or more devices not connected with the plurality of intelligent land buoys 105 via the API 695. The one or more remote computer servers 615 can receive client preference information from third party clients 625 via the API 695. The client preference information can include a fuel economy preference (i.e., most fuel efficient route preference), a transit time preference (i.e., a most efficient route in terms of time), a proximity to points of interest preference (i.e., the most scenic or interesting route), an avoidance of hazards preference (i.e., a safest route), or the like. The one or more remote servers 615 can generate the vehicle operational intelligence information 130 based at least on the client preference information.

The one or more remote servers 615 can transmit and/or receive the situational awareness information 125, the vehicle operational intelligence information 130, and/or the client preference information to a remote device such as the third party servers 620. The third party clients 625 can subscribe to or otherwise receive the operational intelligence information 130 from the one or more remote servers 120.

The operational intelligence information 130 can be monetized. For example, the third party clients 625 may pay value for the operational intelligence information 130. The value can be in the form of real currency such as dollars, credits, points, digital or virtual currency, or the like. The value can be paid on a per-time-unit basis, a per-data-unit basis, and/or as a one-time access fee, or the like. The value can be automatically transferred from the vehicle or third party client to the provider of the operational intelligence information 130. Multiple tiers of operational intelligence information 130 can be provided based on corresponding tiers of value paid. For example, a safety tier can provide navigation safety operational intelligence information. By way of another example, a scenic tier can provide scenic or points of interest operational intelligence information. By way of yet another example, a fuel efficiency tier can provide fuel efficiency operational intelligence information, and so forth. The vehicle and/or third party client may opt-in or opt-out of the paid service. As an alternative to a pay service, a free service may provided in which the operational intelligence may include one or more advertisements. The advertisements can be targeted. For example, if the vehicle is in a particular town close to a particular hotel, an advertisement for the particular hotel can be provided to the vehicle or vehicle occupants.

The type of operational intelligence provided can be based on the type of vehicle or third party client. For example, the vehicle or third party client can broadcast an ID, an SSID, or the like. Such ID or SSID may include the type of vehicle or client. For example, some vehicles might be passenger automobiles, some might be long-haul trucks, some might be pick-up trucks, some might be electric vehicles, some might be sports cars, some might be trains, and so forth. The operational intelligence can then be customized to that particular type of vehicle. For example, long-haul trucks cannot travel on all roads, but must be carefully directed to navigate away from steep roads, narrow roads, tight intersections, and the like. A sports car may prefer routes having no speed bumps. Large vehicles may prefer fuel efficient routes. Trains may prefer customized guidance for selecting routes based on number of rail crossings, schedule conflicts, or the like. Such preferences can be automatically determined based on the broadcasted vehicle type, and incorporated within the operational intelligence provided to the vehicle.

The intelligent land buoy 105 may receive situational awareness information 125 directly from an antenna 698 located on the vehicle 115. In addition or alternatively, the remote servers 615 may receive situational awareness information 125 directly from the antenna 698 located on the vehicle 115.

Figure 7:
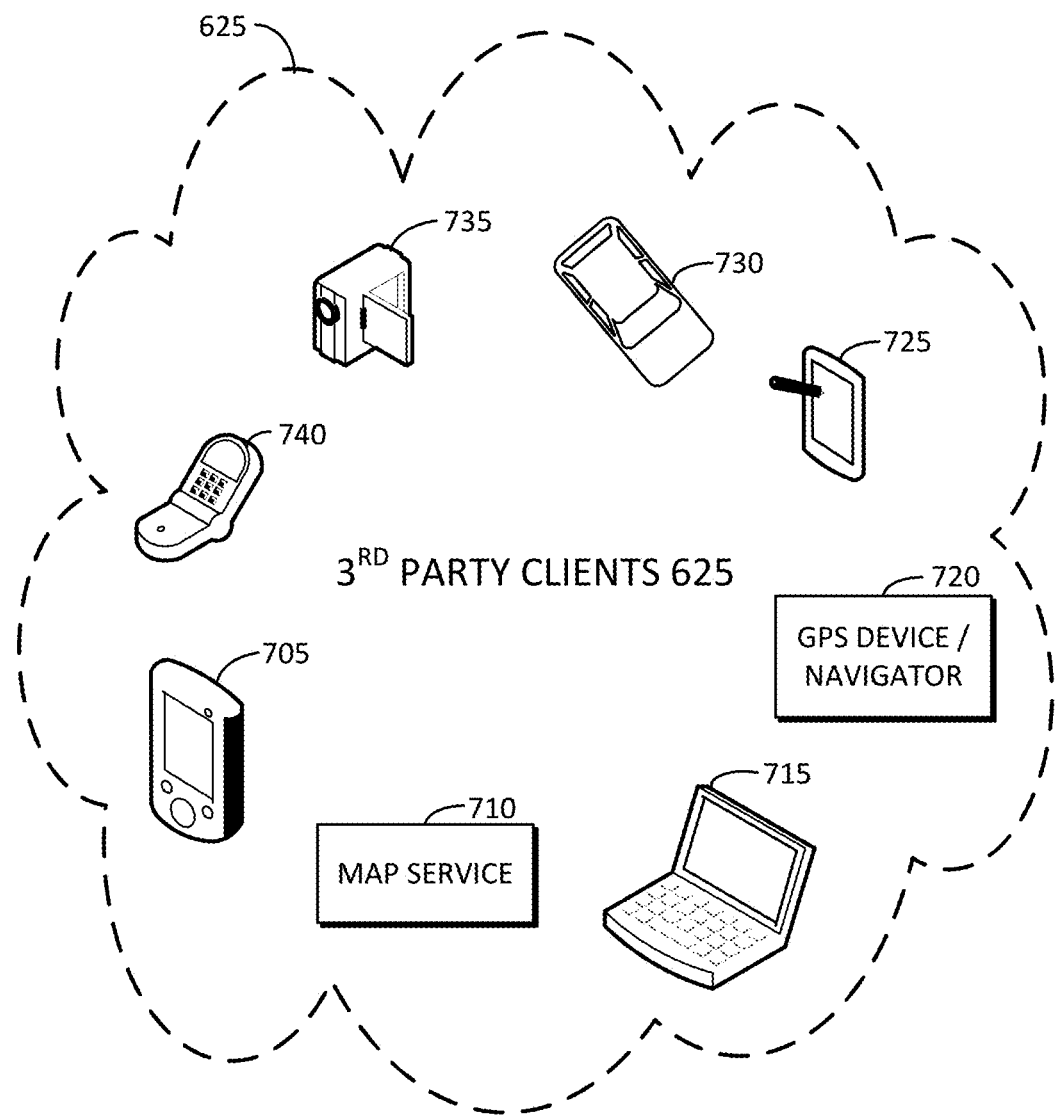
FIG. 7 illustrates a diagram of various example third party clients in accordance with embodiments of the present invention.

FIG. 7 illustrates a diagram of various example third party clients 625 in accordance with embodiments of the present invention. The third party clients 625 can include, for example, a smart phone 705, a map service 710, a computer 715, a GPS device and/or navigator system 720, a tablet 725, a vehicle 730, a camera 735, a phone 740, or the like.

Figure 8:
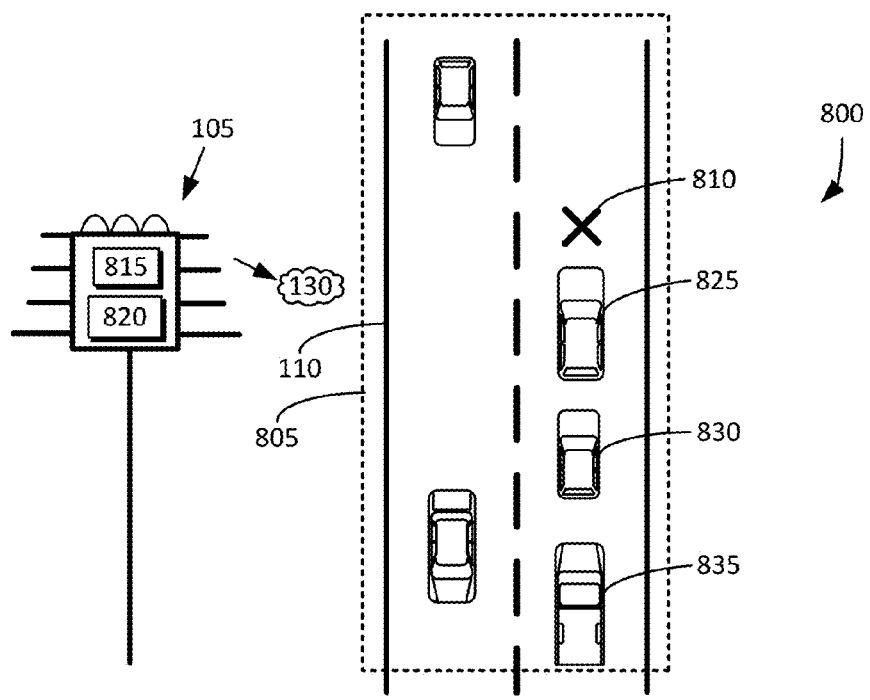
FIG. 8 illustrates a diagram of an intelligent land buoy associated with a route segment having an obstruction impeding the flow of traffic, in accordance with embodiments of the present invention.

FIG. 8 illustrates a diagram 800 of an intelligent land buoy 105 associated with a route segment 805 of a road 110 having an obstruction 810 impeding the flow of traffic. The intelligent land buoy 105 can include identification logic 815 to identify, based at least on the situational awareness information associated with the route segment 805, the presence of the traffic obstruction 810. The term "logic" as used herein can include software, hardware, firmware, or any combination thereof. The intelligent land buoy 105 can include tracking logic 820 to track, based at least on the situational awareness information associated with the route segment 805, the presence, position, and speed of the traffic obstruction 810. The traffic obstruction 810 can include a vehicle, a pedestrian, an animal, road debris, an object, or the like. The traffic obstruction can be an ambulance, police vehicle, or other public service vehicle, and the one or more vehicles 115 can be instructed to and/or autonomously controlled to automatically pull to the side of the road or take an alternate route.

The intelligent land buoys 105 essentially have "machine vision" in which objects can be recognized, identified, and quantified. The intelligent land buoys 105 can also detect and quantify vehicle traffic flow, speed, and/or density. For example, the intelligent land buoys 105 can use machine vision to calculate the current load and/or utilization efficiency of a route segment (e.g., 805). Such calculation can include the number of vehicles on the road, the capacity of the road, and the like.

While the vehicle 825 may have a direct line of sight to the obstruction 810, the vehicles further back (e.g., 830 and 835) have no direct line of sight to the obstruction 810, and therefore, such vehicles conventionally are unable to take evasive action or plan for alternative routes. Using the embodiments of the invention described herein, the rearward vehicles (e.g., 830 and 835) can receive operational intelligence information 130 from the intelligent land buoy 105 so that alternate routes can be taken or other evasive action can be taken before it is too late. Therefore, the vehicles can travel from one point to another more safely and efficiently. The operational intelligence 130 can be based at least in part on the identification logic 815 and the tracking logic 820.

Figure 9:
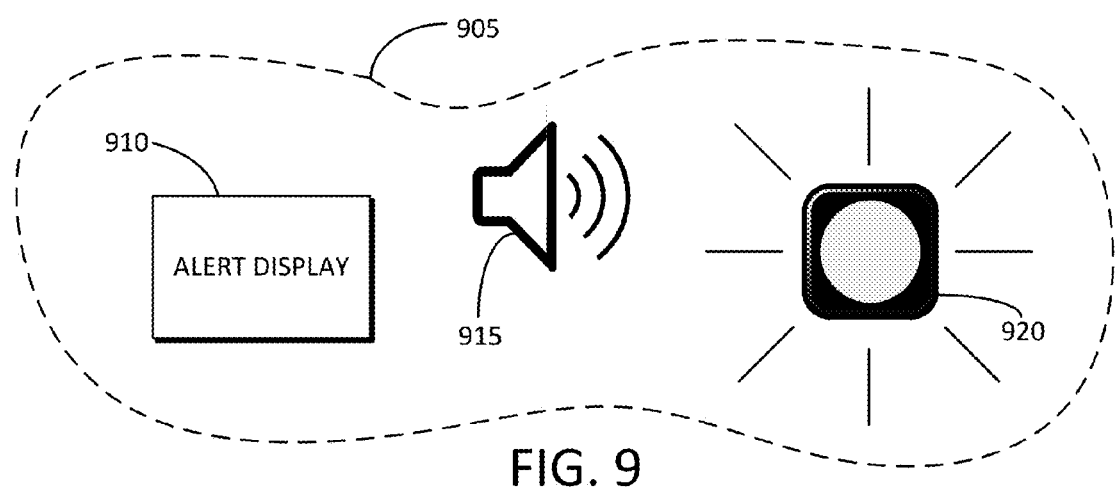
FIG. 9 illustrates a diagram of various kinds of alerts in accordance with embodiments of the present invention.

FIG. 9 illustrates a diagram of various kinds of alerts 905 in accordance with embodiments of the present invention. The alerts 905 can be provided to the one or more vehicles 115 (of FIG. 1), the third party clients 625 (of FIG. 7), the third party servers (of FIG. 6), and the like. In some embodiments, one or more of the alerts 905 may be in a location proximate to an occupant of a vehicle 115 to alert the occupant. The alerts 905 can include an alert display 910 that is visible to the occupant, an audible alert 915, and/or a blinking light or other suitable light emission alert 920. The alerts 905 can be a tactile type alert. The alerts 905 may be presented via the use of one or more monitors, portable devices (such as a tablet or phone), a heads-up display, an audible prompt, a vibration of one or more seats within a vehicle, or the like. The alert may be a colored overlay on the display.

The vehicle operational intelligence 130 can include a predictive awareness alert manifested through one or more of the alerts 905 indicating a time period within which an occupant in a particular vehicle from among the one or more vehicles 115 is advised to take operational control of the particular vehicle. The occupant can be prompted by one or more of the alerts 905 to either take manual control of the vehicle or to select a new destination. A threshold of acceptable risk can be defined based at least on current legal regulations on a federal, state, or local level. The enabling of the alert can be based on such threshold. The alert can warn the operator or passenger of the vehicle of an impending or approaching danger, such as a busy intersection, a rail crossing, a sharp turn or curve, an accident, an obstacle, a pot hole, or the like.

In the case where the occupant of the vehicle fails to act (i.e., fails to take manual control of the vehicle) within a predefined period of time, then the vehicle may autonomously take action to ensure occupant safety by either slowing the vehicle, choosing a new destination or route, and/or coming to a complete stop at a safe location pending further action by the occupant.

Figure 10A:
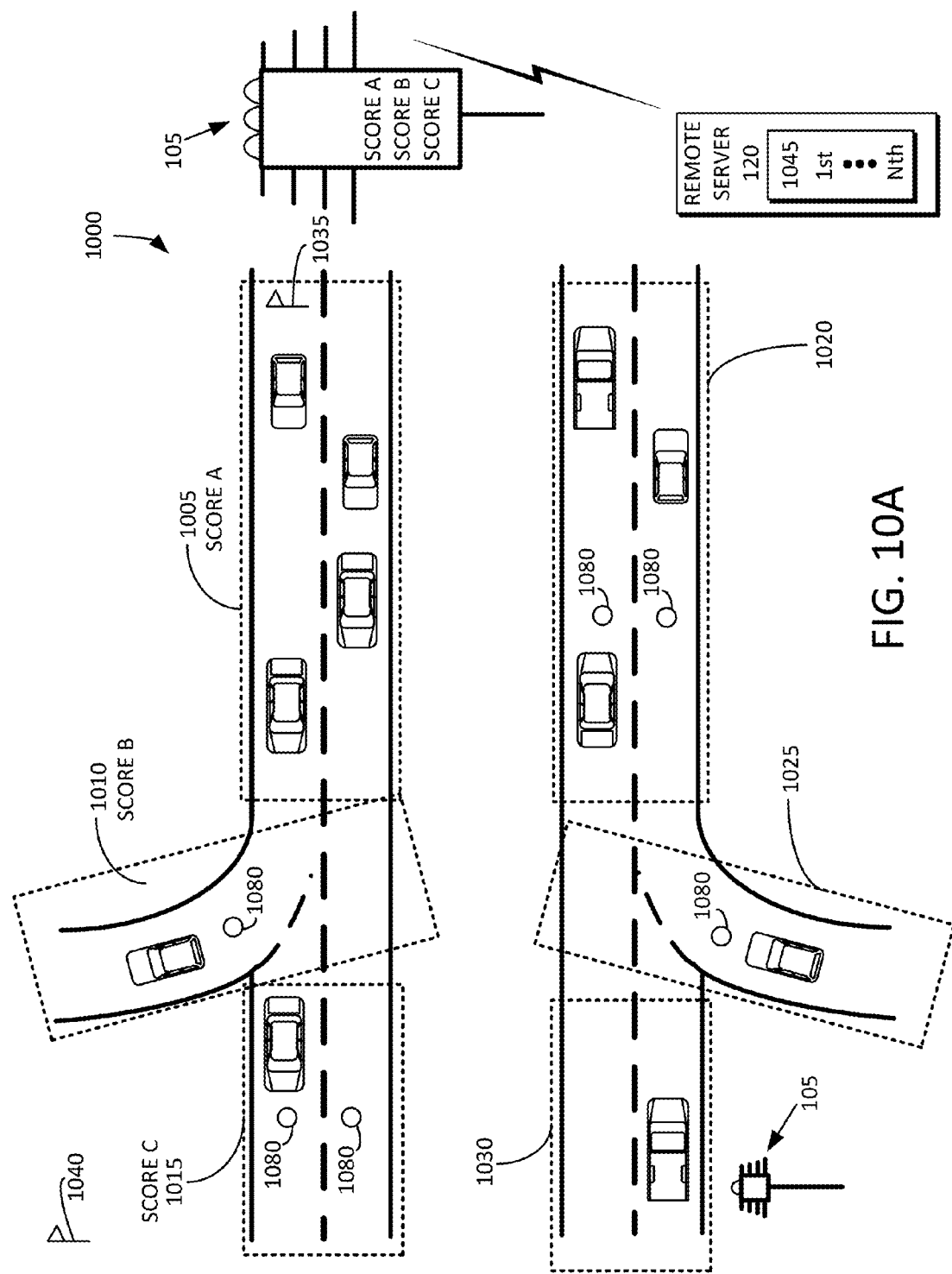
FIG. 10A illustrates a diagram of an intelligent land buoy associated with multiple route segments in accordance with embodiments of the present invention.

FIG. 10A illustrates a diagram 1000 of an intelligent land buoys 105 associated with multiple route segments (e.g., 1005, 1010, 1015, 1020, 1025, and 1030) in accordance with embodiments of the present invention. The term "route segment" can refer to a section of road, a highway, an intersection, or a point at which multiple roads or highway segments intersect.

The intelligent land buoys 105 can gather the situational awareness information about each of the route segments 1005 within their domain. In other words, each of the intelligent land buoys 105 may have associated therewith one or more route segments 1005. The route segments 1005 need not be exclusively associated with a single intelligent land buoy 105, but rather in some cases, the route segments 1005 may be associated with multiple intelligent land buoys 105. The intelligent land buoys 105 can compress the situational awareness information 125 about each of the route segments 1005. The situational awareness information 125 can include information from sensors 1080, or other situation awareness information 125 described in detail herein.

In some embodiments, the intelligent land buoys 105 can compress the situational awareness information 125 into a corresponding route segment impedance score (e.g., score A, score B, and score C) for each route segment (e.g., 1005, 1010, and 1015). In other words, multiple impedance scores can be generated and stored in the intelligent land buoy 105. Each impedance score can be associated with a corresponding route segment.

The situational awareness information 125 can be weighted and/or normalized to facilitate their representation as numerical impedance scores. The impedance scores can represent a range of numeric values indicating the burden or desirability of a particular segment of road or points along a route. The impedance scores (e.g., score A, score B, and score C) can be stored by the intelligent land buoy 105 and/or transmitted to the one or more remote servers 120.

In some embodiments, the intelligent land buoy 105 can aggregate the impedance scores into aggregated route segment impedance scores 1045. The intelligent land buoys 105 can transmit the aggregated route segment impedance scores 1045 to the one or more remote computer servers 120.

In some embodiments, the intelligent land buoy 105 can transmit the raw impedance scores (e.g., score A, score B, and score C) for each corresponding route segment to the one or more remote servers 120. The one or more remote servers 120 can aggregate a first portion (e.g., including score A and score B) of the route segment impedance scores associated with a first complete route (e.g., including route segments 1005 and 1010) between a first geographic location 1035 and a second geographic location 1040.

The one or more remote computer servers 120 can aggregate a second portion (e.g., including score A, score B, and score C) of the route segment impedance scores associated with a second complete route (e.g., including route segments

1005, 1010, and 1015) between the first geographic location 1035 and the second geographic location 1040. In similar fashion, the one or more remote computer servers 120 can aggregate N portions of the route segment impedance scores associated with corresponding N routes between the first geographic location 1035 and the second geographic location 1040. For example, N may be equal to or greater than 3.

Put differently, the aggregated N portions of route segment impedance scores 1045 may include the first aggregated portion of scores, the second aggregated portion of scores, and so on, through the Nth aggregated portion of scores. Each aggregated portion of scores (e.g., aggregated portions $1^{st}$ through Nth) represents an aggregated impedance score of a complete route from point 1035 to point 1040.

FIG. 10B illustrates a table 1050 including example associations between route segments (e.g., 1005, 1010, and 1015) and corresponding impedance scores 1068 in accordance with embodiments of the present invention. In this example, route segment 1005 is determined to have an impedance score of 0.6, route segment 1010 is determined to have an impedance score of −0.3, and route segment 1015 is determined to have an impedance score of 0.8. Each impedance score 1068 is a representation of the difficulty a vehicle would have in traveling a particular route segment. The difficulty can be influenced by various kinds of factors, which are gathered as the situational awareness information described above, and processed and compressed by the intelligent land buoys 105. Each factor can be assigned a different weight. The intelligent land buoys 105 can generate the impedance scores 1068.

For example, the intelligent land buoys 105 can generate the route segment impedance scores based at least on a plurality of weighted factors, which can include rain, fog, visibility, traffic density, pedestrian density, road hazard, road condition, rail crossings, bridges, intersection points, or the like. In some embodiments, the impedance score 1068 can range between positive one (1) and negative one (−1), with a positive or higher relative score representing greater difficulty, and a negative or lower relative score representing less difficulty. It will be understood that any suitable score scale can be used.

FIG. 10C illustrates a table 1055 including example associations between complete routes and aggregated portions of route segment impedance scores in accordance with embodiments of the present invention. In this example, the first complete route includes route segments 1005 and 1010 (of FIG. 10A). A corresponding aggregated portion of route segment scores for route segments 1005 and 1010 is equal to 0.3 (i.e., 0.6+(−0.3)). Similarly, the second complete route includes route segments 1005, 1010, and 1015 (of FIG. 10A). A corresponding aggregated portion of route segment scores for route segments 1005, 1010, and 1015 is equal to 1.1 (i.e., 0.6+(−0.3)+0.8). Similar aggregation of portions of route segment scores can occur for N complete routes.

In some embodiments, each aggregated portion can be normalized (e.g., 1047), i.e., divided by the number of route segments associated with that portion. For example, for the first route, the aggregated value 0.3 can be divided by 2 (i.e., the number of route segments for the first route), which results in a normalized aggregated value 1062 of 0.15. By way of another example, for the second route, the aggregated value 1.1 can be divided by 3 (i.e., the number of route segments for the second route), which results in a normalized aggregated value of 0.367. Such normalization can be applied to the aggregated portion of route segments scores associated with the first route through the Nth route.

The intelligent land buoys 105 (of FIG. 1) can transmit the raw impedance scores and/or the aggregated N portions of route segment impedance scores 1045 to the one or more remote computer servers 120 (of FIG. 1). The one or more computer servers 120 can receive such raw scores and/or aggregated portions from multiple different intelligent land buoys 105. The one or more remote computer servers 120 can select from among the aggregated N portions 1045 a present lowest aggregated impedance score 1060 associated with a particular one complete route (e.g., first route) from among the N complete routes. Such a selection can be made from among the N complete routes associate with one or more intelligent land buoys 105. The one or more remote computer servers 120 can transmit a present lowest impedance route selection (e.g., first route) to the plurality of intelligent land buoys 105 based at least on the present lowest aggregated impedance score 1060.

In addition, the one or more remote computer servers 120 can select from among the aggregated N portions a predicted future lowest aggregated impedance score 1070 associated with a particular complete route (e.g., first route) from among the N routes. Similarly, the predicted future score 1075 can be based at least on a history 1065 of prior impedance scores. For example, based on the predictable and historical rush hour traffic, future congestion can be predicted to occur during similar time periods. The one or more remote computer servers 120 can determine a predicted lowest impedance route selection (e.g., first route) based at least on the predicted future lowest aggregated impedance scores 1070, 1075, etc. The one or more remote computer servers 120 can transmit the selection to the intelligent land buoys 105.

The one or more remote servers 120 can alter in real-time the predicted lowest impedance route selection based at least on the new situational awareness information 125 periodically received. The one or more remote servers 120 can transmit the altered predicted lowest impedance route selection to the intelligent land buoys 105 and/or directly to the one or more vehicles 115. The intelligent land buoys 105 may relay the altered predicted lowest impedance route selection to the one or more vehicles 115. In this manner, the one or more vehicles 115 can be substantially up-to-date at all times with the route having the predicted lowest impedance. As the real world situation changes over time, so too can the vehicle automatically adjust and take the route having the predicted lowest impedance. The vehicle can autonomously re-route, slow down, speed up, stop, change direction, or the like. The one or more vehicles 115 can receive the route selection more frequently from intelligent land buoys 105 that are relatively closer, and less frequently from intelligent land buoys 105 that are relatively farther away.

As mentioned above, the one or more remote servers 120 can receive external data 690 (of FIG. 6) from one or more devices not necessarily connected with the intelligent land buoys 105. The one or more remote servers 120 can generate the predicted lowest impedance route selection based at least on the external data.

Figure 11:
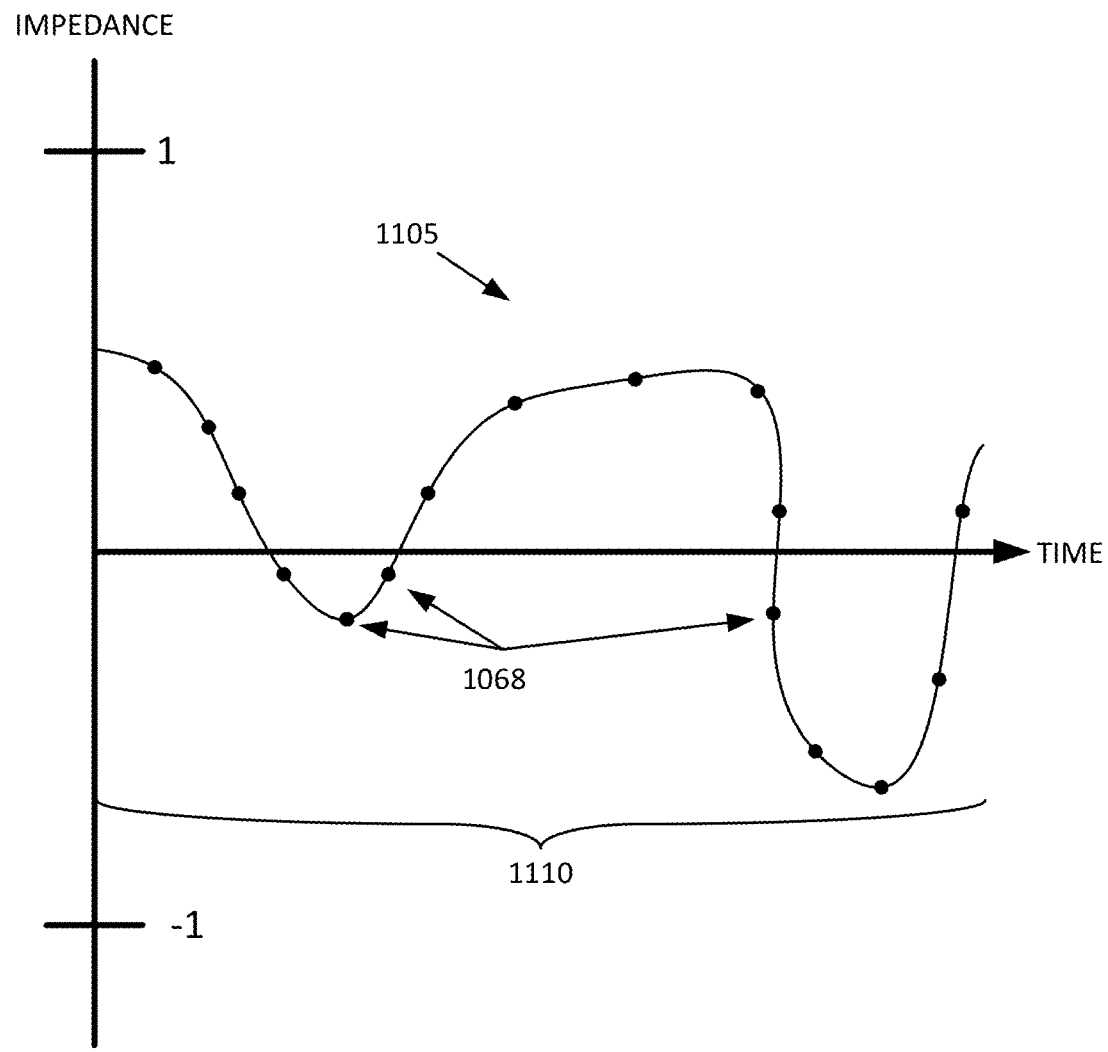
FIG. 11 illustrates a diagram of an impedance function in the time domain in accordance with embodiments of the present invention.

FIG. 11 illustrates a diagram of an impedance function 1105 in the time domain in accordance with embodiments of the present invention. The intelligent land buoys 105 can include impedance score logic to generate impedance score probability functions (e.g., 1105) in the time domain based on the route segment impedance scores (e.g., 1068) for predefined time periods (e.g., 1110). In other words, the time domain representation of impedance for a given route segment can be described as a probability density function.

The impedance score probability density function 1105 can be representing as a set of values between −1 and 1 plotted on the Y-Axis of a graph, and where time is plotted on the X-Axis. X=0 can represent the current time. The X-Axis can be understood to cover a variable range of time values such that a prediction or probability of impedance scores 1068 may cover a span or hours, days, and/or weeks.

The intelligent land buoys 105 can generate impedance score probability functions such as 1105 in the time domain based on the route segment impedance scores 1068 for predefined time periods. The intelligent land buoys 105 can transform the impedance score probability functions into the frequency domain. The frequency domain transformation can be based at least on a Laplace series transform, Fourier series transform, Z-Transform, or the like.

The intelligent land buoys 105 can transmit the transformed impedance score probability functions to the one or more remote computer servers 120. The one or more remote computer servers 120 can generate the predicted lowest impedance route selection (e.g., first route) based at least on the transformed impedance score probability functions. In this manner, the impedance score information is compressed and transmitted more efficiently. Rather than transmit vast amounts of data over networks, which can sometime suffer from slowness or latency, the large quantities of situational awareness information 125 can instead be condensed into a single transformed impedance score probability function for each route segment. This technique allows for situational awareness information 125 to be gathered and processed in real-time or near real-time. Moreover, such technique enables the vehicle operational intelligence 130 to be provided in real-time or near-real time. In this manner, autonomous and semi-autonomous vehicles can have access to real-time and predictive operational intelligence.

Other factors may influence the impedance score probability functions. For example, the number of third party clients 625 (of FIG. 6) and/or the number of vehicles 115 can affect the impedance score probability function. A relatively higher number of vehicles requesting information for a particular road segment or point may indicate a predictive factor of future congestion. The one or more remote servers 120 may also receive inputs or informational "feeds" using APIs from third parties (such as third party servers 620 and/or third party clients 625 of FIG. 6). These "feeds" or "input feeds" can provide additional inputs such as points of interest (e.g., locations of wineries, vistas, historical sites, etc.), proximity and utilization of electric vehicle charging stations, timing and location of events such as marathons, large gatherings of people, and the like. Such factors may influence the impedance score probability functions.

The one or more remote servers 120 may also transmit outputs or information "feeds" using the APIs from third parties (such as third party servers 620 and/or third party clients 625 of FIG. 6). These "feeds" or "output feeds" can include the operational intelligence information 130. More specifically, such "output feeds" can include the route impedance information described in detail above. The third party clients, such as a map service, a navigation device, and the like, can receive and incorporate the route impedance information into its functionality to provide a more accurate service.

Figure 12:
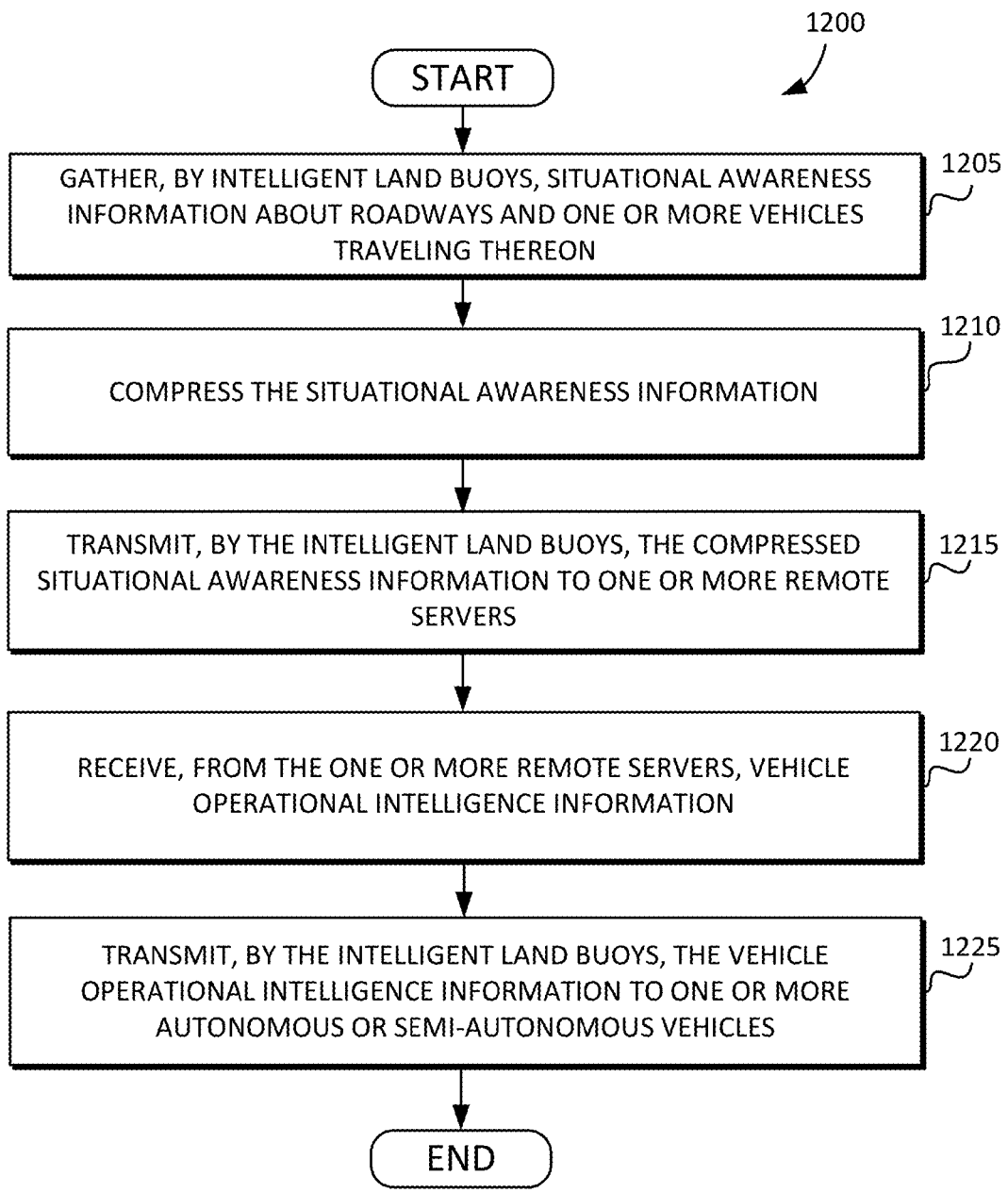
FIG. 12 is a flow diagram illustrating a technique for providing dynamic routing intelligent vehicle enhancement services in accordance with embodiments of the present invention.

FIG. 12 is a flow diagram 1200 illustrating a technique for providing dynamic routing intelligent vehicle enhancement services in accordance with embodiments of the present invention. The technique begins at 1205 where intelligent land buoys can gather situational awareness information about roadways and one or more vehicles traveling thereon. The flow proceeds to 1210 where the situational awareness information is compressed, as discussed in detail above. At 1215, the compressed situational awareness information can be transmitted by the intelligent land buoys to one or more remote servers. At 1220, the intelligent land buoys can receive, from the one or more remote servers, vehicle operational intelligence information, as also described in detail above. The flow then proceeds to 1225, where the intelligent land buoys can transmit the vehicle operational intelligence information to one or more autonomous or semi-autonomous vehicles.

Figure 13:
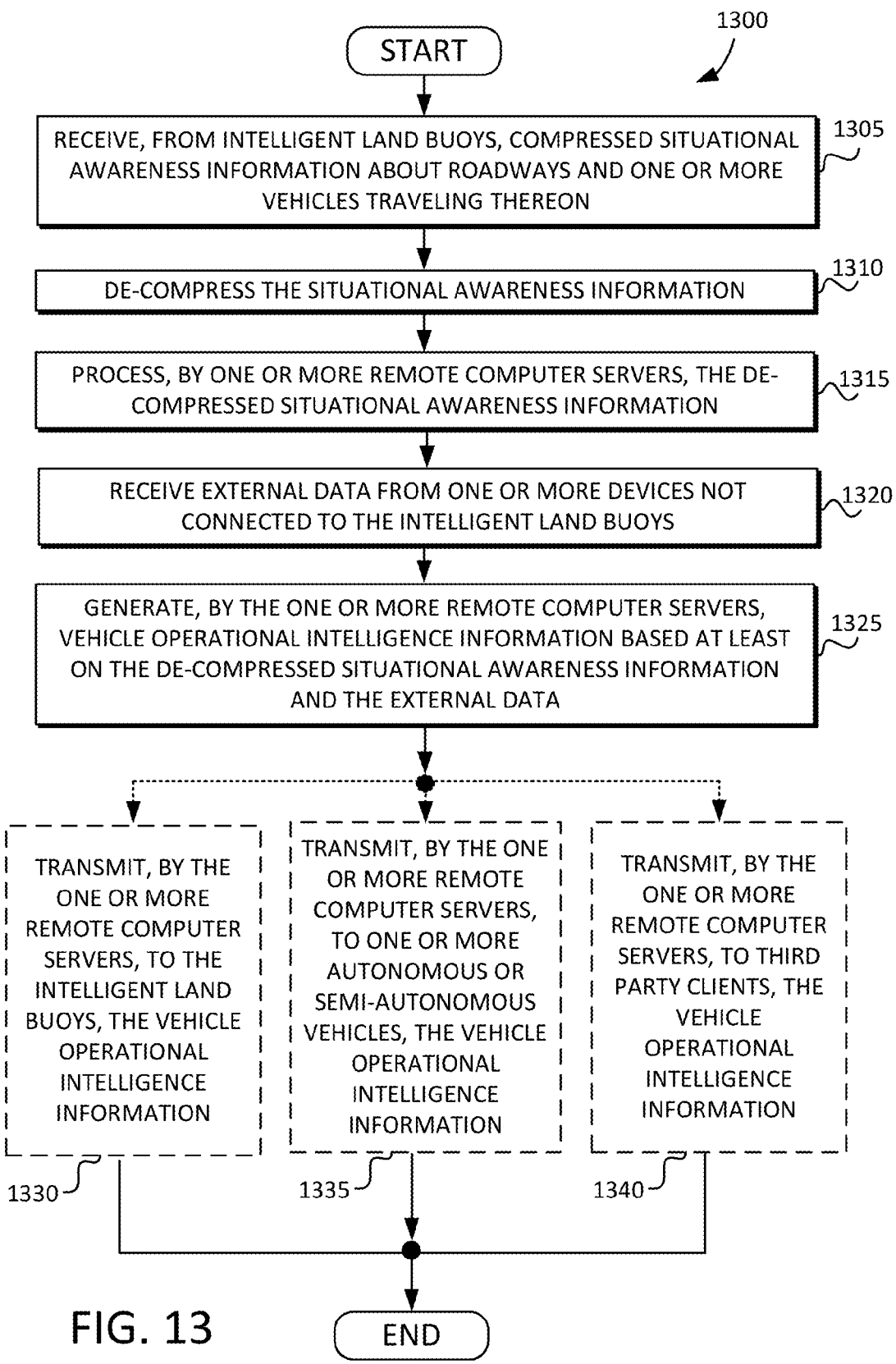
FIG. 13 is a flow diagram illustrating another technique for providing dynamic routing intelligent vehicle enhancement services in accordance with embodiments of the present invention.

FIG. 13 is a flow diagram 1300 illustrating another technique for providing dynamic routing intelligent vehicle enhancement services in accordance with embodiments of the present invention. The technique begins at 1305 where one or more remote servers receive, from one or more intelligent land buoys, compressed situational awareness information about roadways and one or more vehicles traveling thereon. At 1310, the one or more remote servers can de-compress the situational awareness information. The flow proceeds to 1315 where the one or more remote computer servers can process the de-compressed situational awareness information. At 1320, the one or more remote servers can receive external data from one or more devices not connected to the intelligent land buoys.

The flow then proceeds to 1325, where the one or more remote computer servers can generate vehicle operational intelligence information based at least on the de-compressed situational awareness information and the external data. The operational intelligence information can be transmitted by the one or more remote servers in one or more fashion. For example, the flow can proceed to 1330, where the one or more remote servers transmit the operational intelligence information to the intelligent land buoys. In addition or alternatively, the one or more remote servers can directly transmit at 1335 the operational intelligence information to one or more autonomous or semi-autonomous vehicles. In addition or alternatively, at 1340, the one or more remote servers can transmit the operational intelligence information to third party clients.

The inventive aspects disclosed herein are particularly advantageous because they increase safety, reduce congestion, provide environmental benefits, reduce the fuel consumption, and provide avoidance of routes under construction. A smart grid is provided, which improves the utility and capacity of existing roads, and enables autonomous and semi-autonomous vehicles to more safely and effectively navigate such roads. The intelligent land buoys are akin to a utility service, which can receive value and exchange value for scarce and highly useful operational intelligence information.

In other embodiments, the intelligent land buoys can detect if a vehicle is not performing properly or not within government clean air or other requirements, and if so, such information can be transferred to a government body, or the vehicle might be instructed to obtain the appropriate mechanical service to remedy the deficiency. Advanced operational intelligence is provided to the vehicle and/or vehicle operator. In addition, preemptive alerts and notifications may be transmitted to the vehicle, a computer within the vehicle, an occupant, and/or an operator. Neural networks or other machine learning mechanisms can be used. For example, the intelligent land buoys and/or the remote computer servers can be part of a neural network.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Embodiments of the invention may include a non-transitory machine-readable medium comprising instructions executable by one or more processors, the instructions comprising instructions to perform the elements of the inventive concepts as described herein.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A dynamic routing intelligent vehicle enhancement system, comprising:
   a plurality of intelligent land buoys that are proximately disposed to a plurality of roadways, each of the intelligent land buoys being configured to gather situational awareness information about the roadways and one or more vehicles traveling thereon, and to compress the situational awareness information; and
   one or more remote computer servers communicatively coupled to the plurality of intelligent land buoys and configured to receive the compressed situational awareness information from the plurality of intelligent land buoys, to decompress the situational awareness information, to process the decompressed situational awareness information, to generate vehicle operational intelligence information based at least on the decompressed situational awareness information, and to transmit the vehicle operational intelligence information to the plurality of intelligent land buoys;
   wherein each of the plurality of intelligent land buoys further comprises:
   one or more short range radio transceivers configured to receive, from the one or more vehicles, at least a first portion of the situational awareness information about the roadways and the one or more vehicles traveling thereon;
   one or more visible light cameras configured to receive at least a second portion of the situational awareness information about the roadways and the one or more vehicles traveling thereon;
   a processor configured to compress the first and second portions of the situational awareness information;
   one or more long range radio transceivers configured to transmit, to the one or more remote computer servers, the compressed situational awareness information; and
   one or more infrared cameras configured to receive at least a third portion of the situational awareness information about the roadways and the one or more vehicles traveling thereon.

2. The dynamic routing intelligent vehicle enhancement system of claim 1, wherein the intelligent land buoys are configured to transmit a beacon including the vehicle operational intelligence information to the one or more vehicles.

3. The dynamic routing intelligent vehicle enhancement system of claim 1, wherein the one or more vehicles include at least one of an autonomous vehicle or a semiautonomous vehicle.

4. The dynamic routing intelligent vehicle enhancement system of claim 1, wherein the vehicle operational intelligence information includes dynamic vehicle routing information.

5. The dynamic routing intelligent vehicle enhancement system of claim 1, wherein the vehicle operational intelligence information includes a predictive awareness alert indicating a time period within which an occupant in a particular vehicle from among the one or more vehicles is advised to take operational control of the particular vehicle.

6. The dynamic routing intelligent vehicle enhancement system of claim 1, wherein the plurality of intelligent land buoys are configured to be located at an elevation that is higher than tops of the one or more vehicles, and to transmit a beacon including the vehicle operational intelligence information toward the one or more vehicles.

7. The dynamic routing intelligent vehicle enhancement system of claim 1, wherein the first portion of the situational awareness information includes at least one of a vehicle identification or a service set identification (SSID).

8. The dynamic routing intelligent vehicle enhancement system of claim 1, wherein:
the first portion of the situational awareness information includes a service set identification (SSID); and
the plurality of intelligent land buoys are configured to detect a first location of a particular vehicle from among the one or more vehicles associated with the SSID, and to detect a second location of the particular vehicle from among the one or more vehicles associated with the SSID.

9. The dynamic routing intelligent vehicle enhancement system of claim 8, wherein:
the plurality of intelligent land buoys are configured to transmit the first location information and the second location information to the one or more remote computer servers; and
the one or more remote computer servers are configured to determine a speed of the particular vehicle based at least on the first location information and the second location information.

10. The dynamic routing intelligent vehicle enhancement system of claim 1, wherein the first portion of the situational awareness information includes at least one of road temperature, wheel slippage information, or pothole presence information.

11. The dynamic routing intelligent vehicle enhancement system of claim 1, wherein each of the plurality of intelligent land buoys further comprises:
one or more motion detectors configured to receive at least a fourth portion of the situational awareness information about the roadways and the one or more vehicles traveling thereon; and
one or more temperature sensors configured to receive at least a fifth portion of the situational awareness information about the roadways and the one or more vehicles traveling thereon.

12. The dynamic routing intelligent vehicle enhancement system of claim 11, wherein each of the plurality of intelligent land buoys is configured to receive at least a sixth portion of the situational awareness information from at least one of an inductive traffic sensor or a strain gauge.

13. The dynamic routing intelligent vehicle enhancement system of claim 1, wherein each of the plurality of intelligent land buoys further comprises:
identification logic configured to identify, based at least on the situational awareness information, the presence of a traffic obstruction.

14. The dynamic routing intelligent vehicle enhancement system of claim 13, wherein each of the plurality of intelligent land buoys further comprises:
tracking logic configured to track, based at least on the situational awareness information, the presence, position, and speed of the traffic obstruction.

15. The dynamic routing intelligent vehicle enhancement system of claim 14, wherein the traffic obstruction includes at least one of a vehicle, a pedestrian, an animal, road debris, or an object.

16. The dynamic routing intelligent vehicle enhancement system of claim 1, wherein:
the plurality of intelligent land buoys are configured to gather the situational awareness information about each of a plurality of route segments, and to compress the situational awareness information about each of the plurality of route segments into a corresponding route segment impedance score;
the plurality of intelligent land buoys are configured to transmit the route segment impedance scores to the one or more remote computer servers;
the one or more remote computer servers are configured to aggregate a first portion of the route segment impedance scores associated with a first route between a first geographic location and a second geographic location, to aggregate a second portion of the route segment impedance scores associated with a second route between the first geographic location and the second geographic location, and to aggregate N portions of the route segment impedance scores associated with corresponding N routes between the first geographic location and the second geographic location.

17. The dynamic routing intelligent vehicle enhancement system of claim 16, wherein:
the one or more remote computer servers are configured to select from among the aggregated N portions a present lowest aggregated impedance score associated with a particular one route from among the N routes; and
the one or more remote computer servers are configured to transmit a present lowest impedance route selection to the plurality of intelligent land buoys based at least on the present lowest aggregated impedance score.

18. The dynamic routing intelligent vehicle enhancement system of claim 16, wherein:
the one or more remote computer servers are configured to select from among the aggregated N portions a predicted future lowest aggregated impedance score associated with a particular one route from among the N routes, wherein the predicted future score is based at least on a history of prior impedance scores; and
the one or more remote computer servers are configured to determine a predicted lowest impedance route selection based at least on the predicted future lowest aggregated impedance score, and to transmit the selection to the plurality of intelligent land buoys.

19. The dynamic routing intelligent vehicle enhancement system of claim 18, wherein:
the plurality of intelligent land buoys are configured to generate the route segment impedance scores based at least on a plurality of weighted factors;
the plurality of weighted factors include at least one of rain, fog, visibility, traffic density, pedestrian density, road hazard, or road condition;
the plurality of intelligent land buoys are configured to generate impedance score probability functions in the time domain based on the route segment impedance scores for predefined time periods;

the plurality of intelligent land buoys are configured to transform the impedance score probability functions into the frequency domain;

the plurality of intelligent land buoys are configured to transmit the transformed impedance score probability functions to the one or more remote computer servers; and the one or more remote computer servers are configured to generate the predicted lowest impedance route selection based at least on the transformed impedance score probability functions.

20. The dynamic routing intelligent vehicle enhancement system of claim 19, wherein the plurality of intelligent land buoys are configured to transform the impedance score probability functions into the frequency domain using at least one of a Laplace series transform, a Fourier series transform, or a Z-Transform.

21. The dynamic routing intelligent vehicle enhancement system of claim 19, wherein:

the one or more remote computer servers are configured to periodically receive new situational awareness information from the plurality of intelligent land buoys; and the one or more remote computer servers are configured to alter in real-time the predicted lowest impedance route selection based at least on the new situational awareness information periodically received; and the one or more remote computer servers are configured to transmit the altered predicted lowest impedance route selection to the plurality of intelligent land buoys.

22. The dynamic routing intelligent vehicle enhancement system of claim 19, wherein:

the one or more remote computer servers are configured to receive external data from one or more devices not connected with the plurality of intelligent land buoys; and the one or more remote computer servers are configured to generate the predicted lowest impedance route selection based at least on the external data.

23. The dynamic routing intelligent vehicle enhancement system of claim 1, wherein:

the one or more remote computer servers are configured to receive client preference information from a plurality of clients;

the plurality of clients include at least one of a vehicle, a computer, a smartphone, a vehicle navigation system, or a map service;

the client preference information includes at least one of a fuel economy preference, a transit time preference, a proximity to points of interest preference, or an avoidance of hazards preference; and the one or more remote computer servers are configured to generate the vehicle operational intelligence based at least on the client preference information.

24. A dynamic routing intelligent vehicle enhancement system, comprising:

a plurality of intelligent land buoys that are proximately disposed to a plurality of roadways, each of the intelligent land buoys being configured to gather situational awareness information about the roadways and one or more vehicles traveling thereon, and to compress the situational awareness information; and one or more remote computer servers communicatively coupled to the plurality of intelligent land buoys and configured to receive the compressed situational awareness information from the plurality of intelligent land buoys, to decompress the situational awareness information, to process the decompressed situational awareness information, to generate vehicle operational intelligence information based at least on the decompressed situational awareness information, and to transmit the vehicle operational intelligence information to the plurality of intelligent land buoys;

wherein each of the plurality of intelligent land buoys further comprises:

one or more short range radio transceivers configured to receive, from the one or more vehicles, at least a first portion of the situational awareness information about the roadways and the one or more vehicles traveling thereon;

one or more visible light cameras configured to receive at least a second portion of the situational awareness information about the roadways and the one or more vehicles traveling thereon;

a processor configured to compress the first and second portions of the situational awareness information;

one or more long range radio transceivers configured to transmit, to the one or more remote computer servers, the compressed situational awareness information;

identification logic configured to identify, based at least on the situational awareness information, the presence of a traffic obstruction; and tracking logic configured to track, based at least on the situational awareness information, the presence, position, and speed of the traffic obstruction.

25. The dynamic routing intelligent vehicle enhancement system of claim 24, wherein the traffic obstruction includes at least one of a vehicle, a pedestrian, an animal, road debris, or an object.

26. A dynamic routing intelligent vehicle enhancement system, comprising:

a plurality of intelligent land buoys that are proximately disposed to a plurality of roadways, each of the intelligent land buoys being configured to gather situational awareness information about the roadways and one or more vehicles traveling thereon, and to compress the situational awareness information; and one or more remote computer servers communicatively coupled to the plurality of intelligent land buoys and configured to receive the compressed situational awareness information from the plurality of intelligent land buoys, to decompress the situational awareness information, to process the decompressed situational awareness information, to generate vehicle operational intelligence information based at least on the decompressed situational awareness information, and to transmit the vehicle operational intelligence information to the plurality of intelligent land buoys;

wherein the plurality of intelligent land buoys are configured to gather the situational awareness information about each of a plurality of route segments, and to compress the situational awareness information about each of the plurality of route segments into a corresponding route segment impedance score;

the plurality of intelligent land buoys are configured to transmit the route segment impedance scores to the one or more remote computer servers; and the one or more remote computer servers are configured to aggregate a first portion of the route segment impedance scores associated with a first route between a first geographic location and a second geographic location, to aggregate a second portion of the route segment impedance scores associated with a second route between the first geographic location and the second geographic location, and to aggregate N portions of the route segment impedance scores associated with corresponding N routes between the first geographic location and the second geographic location.

27. The dynamic routing intelligent vehicle enhancement system of claim 26, wherein:

the one or more remote computer servers are configured to select from among the aggregated N portions a present lowest aggregated impedance score associated with a particular one route from among the N routes; and the one or more remote computer servers are configured to transmit a present lowest impedance route selection to the plurality of intelligent land buoys based at least on the present lowest aggregated impedance score.

28. The dynamic routing intelligent vehicle enhancement system of claim 26, wherein:

the one or more remote computer servers are configured to select from among the aggregated N portions a predicted future lowest aggregated impedance score associated with a particular one route from among the N routes, wherein the predicted future score is based at least on a history of prior impedance scores; and the one or more remote computer servers are configured to determine a predicted lowest impedance route selection based at least on the predicted future lowest aggregated impedance score, and to transmit the selection to the plurality of intelligent land buoys.

29. The dynamic routing intelligent vehicle enhancement system of claim 28, wherein:

the plurality of intelligent land buoys are configured to generate the route segment impedance scores based at least on a plurality of weighted factors;

the plurality of weighted factors include at least one of rain, fog, visibility, traffic density, pedestrian density, road hazard, or road condition;

the plurality of intelligent land buoys are configured to generate impedance score probability functions in the time domain based on the route segment impedance scores for predefined time periods;

the plurality of intelligent land buoys are configured to transform the impedance score probability functions into the frequency domain;

the plurality of intelligent land buoys are configured to transmit the transformed impedance score probability functions to the one or more remote computer servers; and the one or more remote computer servers are configured to generate the predicted lowest impedance route selection based at least on the transformed impedance score probability functions.

30. The dynamic routing intelligent vehicle enhancement system of claim 29, wherein the plurality of intelligent land buoys are configured to transform the impedance score probability functions into the frequency domain using at least one of a Laplace series transform, a Fourier series transform, or a Z-Transform.

31. The dynamic routing intelligent vehicle enhancement system of claim 29, wherein:

the one or more remote computer servers are configured to periodically receive new situational awareness information from the plurality of intelligent land buoys; and the one or more remote computer servers are configured to alter in real-time the predicted lowest impedance route selection based at least on the new situational awareness information periodically received; and the one or more remote computer servers are configured to transmit the altered predicted lowest impedance route selection to the plurality of intelligent land buoys.

32. The dynamic routing intelligent vehicle enhancement system of claim 29, wherein:

the one or more remote computer servers are configured to receive external data from one or more devices not connected with the plurality of intelligent land buoys; and the one or more remote computer servers are configured to generate the predicted lowest impedance route selection based at least on the external data.

\* \* \* \* \*